Oct. 29, 1929.        H. HAALCK        1,733,407
TORSION BALANCE FOR MEASURING DIFFERENCES OF GRAVITY
Filed July 31, 1926
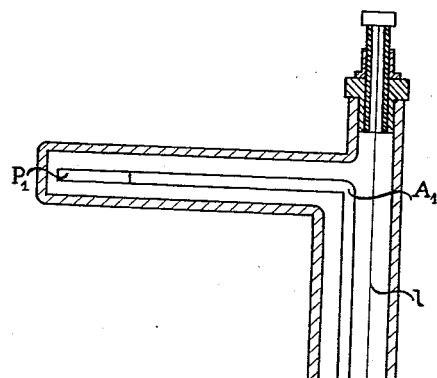
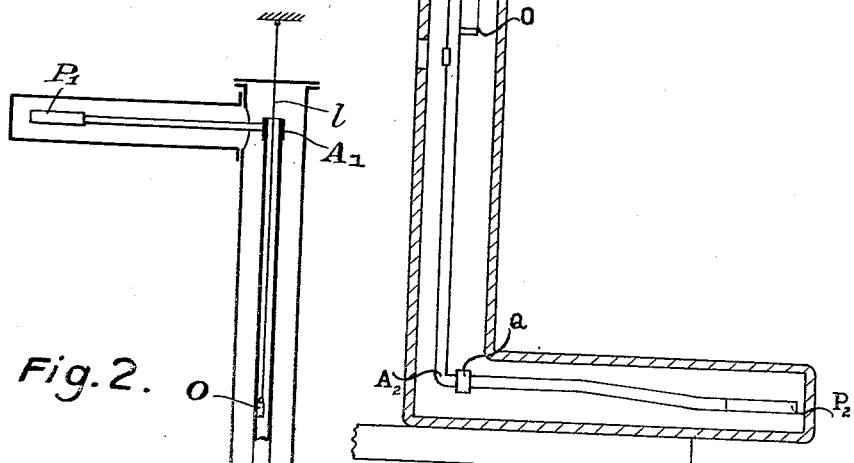
Inventor.
Hans Haalck.
By
Attorney.

Patented Oct. 29, 1929

1,733,407

UNITED STATES PATENT OFFICE

HANS HAALCK, OF BERLIN-STEGLITZ, GERMANY, ASSIGNOR TO THE FIRM: EXPLORATION BODENUNTERSUCHUNGS & VERWERTUNGS-G. M. B. H., OF BERLIN, GERMANY

TORSION BALANCE FOR MEASURING DIFFERENCES OF GRAVITY

Application filed July 31, 1926, Serial No. 126,186, and in Germany May 8, 1926.

The Eötvös torsion balance is constructed with horizontal beams; one weight being placed level with or above the beam and the other weight below the beam. Practically the beam may have any form, but the weights must be placed on different levels. Eötvös torsion balance is described in the publication of the "Zentralbüros der Internationalen Erdmessung" Budapest, 1906.

In this invention the form of the beam is such as to simplify the construction of the whole apparatus and to afford a convenient handling of the instrument without disturbing its sensitiveness.

The construction of the invention is shown in the drawing in which:

Figure 1 is an axial vertical section of my torsion balance.

Figure 2 is a similar view showing the vertical beam partially in section.

To the ends of a vertical beam $A_1$ $A_2$ horizontal or oblique beams are affixed which bear the weights $P_1$ and $P_2$.

At a small lateral lug O, at any level, the torsion wire 1 is attached to the axis $A_1$ and $A_2$.

In order to avoid a tilting over of the beam, the point of suspension O must be above the center of gravity of the hanging system.

By movement of a small weight Q (Fig. 1) fixed to the lower beam in the direction of the torsion wire 1 the center of gravity may be lowered.

By constructing according to this description it is possible to surround the torsion wire and the beam with the same case thus reducing the size and weight of the whole apparatus and securing more convenient handling.

A tube may be used for the vertical beam $A_1$ $A_2$ and the torsion wire 1 may be lead through it, see Fig. 2.

It is not necessary that the vertical beam should be straight. It may be a broken line and may, for instance, have two small rectangular turns but it is necessary that the vertical beam and the point of suspension should be enclosed by the same case. It is best to form the whole system $P_1$ $A_1$ $A_2$ $P_2$ from one piece of turned tube.

Claims:

1. A torsion balance comprising a beam, means for suspending the beam so that its longitudinal axis is substantially vertical, and weights located laterally to the beam at vertically-separated points along said vertical beam by means of laterally extending arms.

2. A torsion balance comprising a beam, means for suspending the beam so that its longitudinal axis is substantially vertical, auxiliary beams extending laterally secured at vertically-separated points along said vertical beam, and weights secured to said auxiliary beams.

3. A torsion balance comprising a tubular beam, a suspension wire for suspending said beam so that its longitudinal axis is substantially vertical, auxiliary beams extending laterally secured at vertically-separated points along said vertical beam, and weights secured to said auxiliary beams.

4. A torsion balance comprising a beam, means for suspending the beam so that its longitudinal axis is substantially vertical, weights located at vertically separated points along said vertical beam, means for attaching said weights by auxiliary beams extending laterally to said vertical beam and a movable weight slidably attached to said auxiliary beam.

5. A torsion balance comprising a beam, a lateral lug on the beam, means secured to said lug for suspending the beam so that its longitudinal axis is substantially vertical, and weights located laterally to said beam at vertically-separated points along said vertical beam by means of laterally extending arms.

6. A torsion balance comprising a tubular beam, a suspension wire led through said tubular beam and adapted to suspend said beam so that its longitudinal axis is substantially vertical, auxiliary beams extending laterally secured at vertically-separated points along said vertical beam, and weights secured to said auxiliary beams.

HANS HAALCK.